United States Patent
Jang et al.

(10) Patent No.: US 7,453,661 B1
(45) Date of Patent: Nov. 18, 2008

(54) SERVO WRITING A DISK DRIVE WITH A CONTROLLED OVERLAP NEAR THE MIDDLE DIAMETER OF THE DISK

(75) Inventors: Jinsheng Bill Jang, Irvine, CA (US); Shih Min Liu, Newport Coast, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 29 days.

(21) Appl. No.: 11/387,343

(22) Filed: Mar. 23, 2006

(51) Int. Cl.
*G11B 21/02* (2006.01)

(52) U.S. Cl. ....................................... 360/75

(58) Field of Classification Search ........... None
See application file for complete search history.

(56) References Cited

U.S. PATENT DOCUMENTS

| | | |
|---|---|---|
| 5,668,679 A | 9/1997 | Swearingen et al. |
| 6,304,407 B1 | 10/2001 | Baker et al. |
| 6,411,453 B1 | 6/2002 | Chainer et al. |
| 6,429,989 B1 | 8/2002 | Schultz et al. |
| 6,504,675 B1 | 1/2003 | Shukh |
| 6,507,450 B1 | 1/2003 | Elliott |
| 6,519,107 B1 | 2/2003 | Ehrlich et al. |
| 6,704,156 B1 | 3/2004 | Baker et al. |
| 6,738,205 B1 | 5/2004 | Moran et al. |
| 6,985,316 B1 | 1/2006 | Liikanen et al. |
| 2002/0015253 A1 | 2/2002 | Litvinov et al. |
| 2002/0036858 A1 | 3/2002 | Bi et al. |
| 2003/0197968 A1 | 10/2003 | Sacks et al. |
| 2004/0061967 A1 | 4/2004 | Lee et al. |
| 2005/0264917 A1* | 12/2005 | Yano et al. ............ 360/75 |

FOREIGN PATENT DOCUMENTS

JP          2000268516          *  9/2000

* cited by examiner

*Primary Examiner*—Andrew L. Sniezek
(74) *Attorney, Agent, or Firm*—Howard H. Sheerin, Esq.

(57) ABSTRACT

A method of servo writing a disk of a disk drive is disclosed, wherein the disk drive comprising the disk and a head actuated over the disk. Servo sectors are written to define servo tracks from a first diameter of the disk to substantially a middle diameter of the disk, wherein the first diameter is selected from one of the outer and inner diameter of the disk. Servo sectors are then written to define servo tracks from a second diameter of the disk toward the middle diameter of the disk by positioning the head over a current servo track, reading the current servo track to generate a read signal, processing the read signal to detect a previously written servo sector, and if a previously written servo sector is not detected, then writing servo sectors to the current servo track and positioning the head over a next servo track.

31 Claims, 16 Drawing Sheets

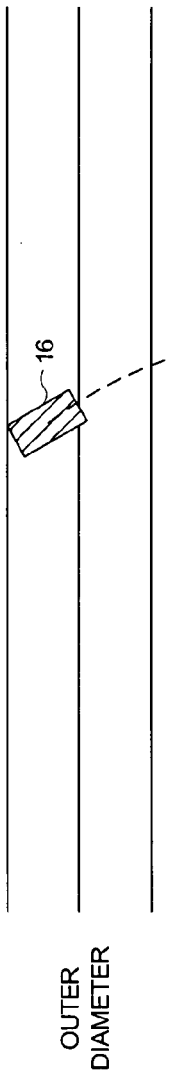
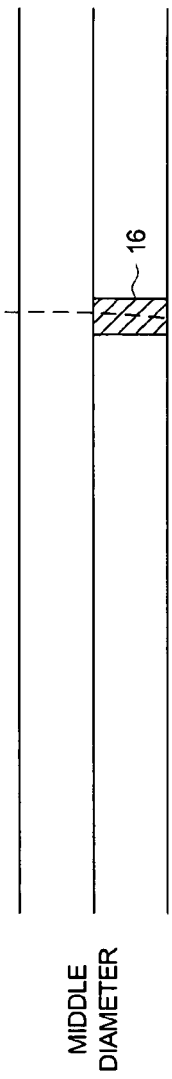
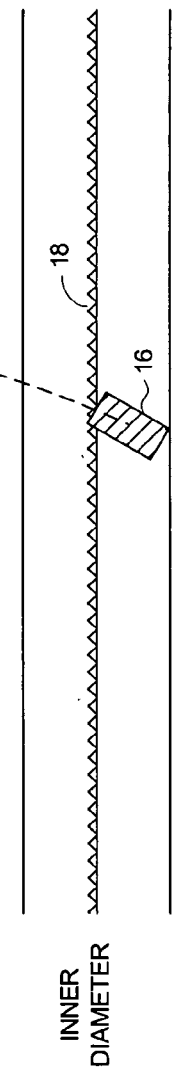

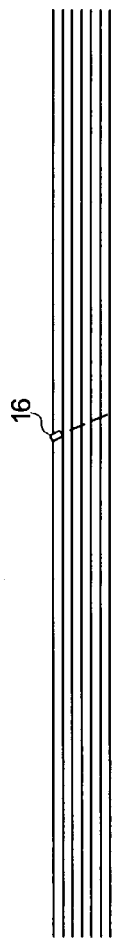
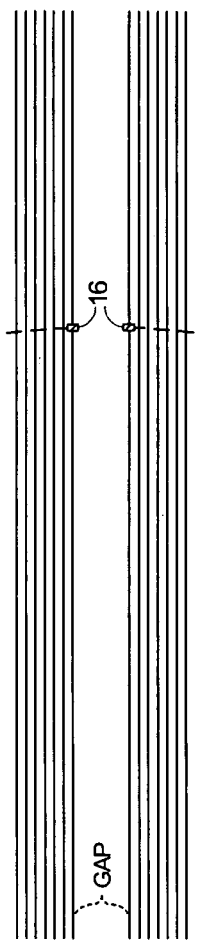
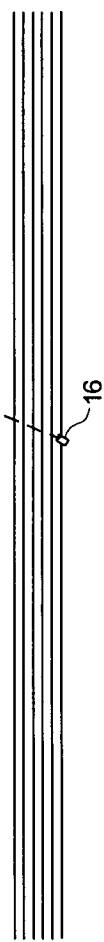
FIG. 3A (Prior Art)
FIG. 3B (Prior Art)
FIG. 3C (Prior Art)

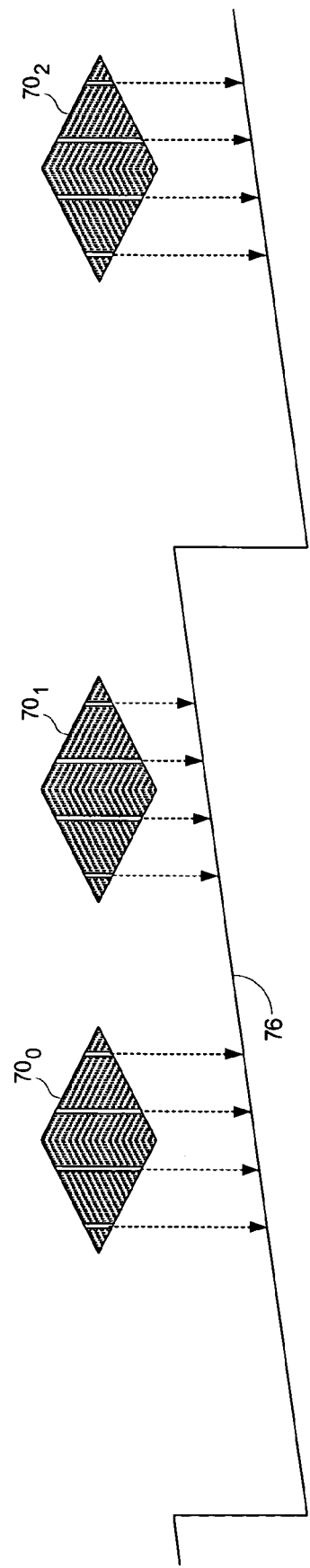
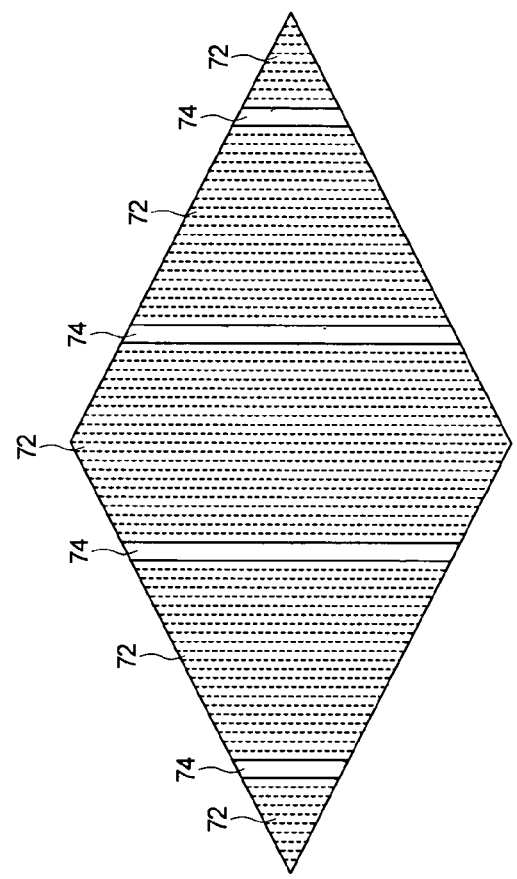
FIG. 10A
FIG. 10B

SERVO WRITING A DISK DRIVE WITH A CONTROLLED OVERLAP NEAR THE MIDDLE DIAMETER OF THE DISK

BACKGROUND OF THE INVENTION

1. Field of the Invention

The present invention relates to disk drives. More particularly, the present invention relates to servo writing a disk drive with a controlled overlap near the middle diameter of the disk.

2. Description of the Prior Art

Disk drives for computer systems comprise a disk for storing data and a head actuated radially over the disk for writing data to and reading data from the disk. To effectuate the radial positioning of the head over the disk, the head is connected to the distal end of an actuator arm which is rotated about a pivot by a rotary actuator (e.g., a voice coil motor (VCM)). The disk is typically divided into a number of concentric, radially spaced tracks, where each track is divided into a number of data sectors. The disk is typically accessed a data sector at a time by positioning the head over the track which comprises the target data sector. As the disk spins, the head writes transitions (e.g., magnetic transitions) in the data sector to record data, and during read operations senses the transitions to recover the recorded data.

Accurate reproduction of the recorded data requires the head to be positioned very close to the centerline of the target data sector during both write and read operations. Thus, accessing a target data sector involves positioning or "seeking" the head to the target track, and then maintaining centerline "tracking" while data is written to or read from the disk. A closed loop servo system typically performs the seeking and tracking operations by controlling the rotary actuator in response to position information generated from the head.

A well known technique for generating the head position control information is to record servo information in servo sectors disbursed circumferentially about the disk, "embedded" with the data sectors. This is illustrated in FIG. 1 which shows a disk 2 comprising a number of concentric data tracks 4 and a number of embedded servo sectors $6_0$-$6_N$. Each servo sector 6; comprises a preamble 8, a sync mark 10, servo data 12, and servo bursts 14. The preamble 8 comprises a periodic pattern which allows proper gain adjustment and timing synchronization of the read signal, and the sync mark 10 comprises a special pattern for symbol synchronizing to the servo data 12. The servo data 12 comprises identification information, such as sector identification data and a track address. The servo control system reads the track address during seeks to derive a coarse position for the head with respect to the target track. The track addresses are recorded using a phase coherent Gray code so that the track addresses can be accurately detected when the head is flying between tracks. The servo bursts 14 in the servo sectors 6 comprise groups of consecutive transitions (e.g., A, B, C and D bursts) which are recorded at precise intervals and offsets with respect to the track centerline. Fine head position control information is derived from the servo bursts 14 for use in centerline tracking while writing data to and reading data from the target track.

The embedded servo sectors 6 are written to the disk 2 as part of the manufacturing process. Conventionally, an external servo writer has been employed which writes the embedded servo sectors 6 to the disks by processing each head disk assembly (HDA) in an assembly line fashion. The external servo writers employ very precise head positioning mechanics, such as a laser interferometer, for positioning the head at precise radial locations with respect to previously servo-written tracks so as to achieve very high track densities. Certain "self-servo writing" technique have also been disclosed wherein components internal to the disk drive are employed to perform the servo writing function.

FIGS. 2A-2C illustrate a problem that manifests when servo writing the disk 2 using perpendicular magnetic recording. When writing the servo sectors $6_0$-$6_N$ from the outer diameter of the disk (FIG. 2A) toward the inner diameter of the disk (FIG. 2C), the skew angle of the head's write pole 16 as it approaches the inner diameter causes the inner corner of the write pole 16 to "swing out" and overwrite a band 18 of the previously written servo data. The overwritten band 18 creates a "seam" between adjacent servo sectors, as well as a seam within each servo sector (including the servo bursts 14) if multiple revolutions are used to "stitch" together each servo sector $6_i$. The technique of "stitching" together a servo sector is typically necessary since the width of the write pole 16 is less than the width of a servo track requiring a portion (e.g., half) of a servo sector to be written during each revolution of the disk. The seams created by the overwrite problem illustrated in FIGS. 2A-2C induce errors in the position error signal generated when reading the servo bursts 14 as well as errors in detecting the servo data field 12, such as the Gray coded track addresses.

The prior art has suggested a number of techniques for addressing the overwrite problem when servo writing a disk drive using perpendicular magnetic recording. For example, U.S. Pat. No. 6,504,675 discloses a disk drive wherein the write pole has a trapezoidal shape in order to reduce the overwrite problem caused by the skew effect. However, the geometry of the trapezoidal shape varies between each disk drive due to tolerances in manufacturing the head, resulting in undesirable seams in the servo wedges for some percentage of the disk drives. In addition, manufacturing the write pole with a trapezoidal shape increases the manufacturing cost of the head, as well as reduces the surface area of the write pole leading to an undesirable decrease in the strength of the magnetic write flux.

U.S. Patent Application No. 2004/0061967 suggests an alternative solution to the overwrite problem by writing the servo sectors $6_0$-$6_N$ from the outer diameter of the disk to the middle diameter, and then from the inner diameter to the middle diameter as illustrated in FIGS. 3A-3B. A problem with this technique, however, is that a gap is created near the middle diameter of the disk (FIG. 3B) where the two segments of a servo wedge "meet". This gap becomes unusable (wasted) surface area reducing format efficiency. In addition, the seek operation in the servo system is adversely affected due to the loss of position information over the gap. This problem is exacerbated due to the disk expanding during the servo writing operation requiring a predetermined margin (wider gap) to account for the worst case deviation in the expansion.

There is, therefore, a need to overcome the problems associated with the skew angle of the head when servo writing a disk drive.

SUMMARY OF THE INVENTION

An embodiment of the present invention comprises a method of servo writing a disk of a disk drive, the disk drive comprising the disk and a head actuated over the disk. Servo sectors are written to define servo tracks from a first diameter of the disk to substantially a middle diameter of the disk, wherein the first diameter is selected from one of the outer and inner diameter of the disk. Servo sectors are then written to define servo tracks from a second diameter of the disk toward the middle diameter of the disk by positioning the head over a current servo track, reading the current servo track to generate a read signal, processing the read signal to detect a previously written servo sector, and if a previously written servo sector is not detected, then writing servo sectors to the current servo track and positioning the head over a next servo track.

In one embodiment, the step of writing servo sectors from the second diameter of the disk toward the middle diameter of the disk comprises the step of continuing to write servo sectors to a predetermined number of servo tracks after detecting the previously written servo sector to form a controlled overlap of servo tracks near the middle diameter of the disk.

In one embodiment, an external servo writer is used to servo write the disk. In another embodiment, a media writer is used to servo write the disk. In yet another embodiment, control circuitry internal to the disk drive is used to servo write the disk.

In yet another embodiment, the step of processing the read signal to detect the previously written servo sector comprises the step of comparing the read signal to a predetermined threshold. In another embodiment, the step of processing the read signal to detect the previously written servo sector comprises the steps of filtering the read signal with a low pass filter to generate a filtered read signal, and comparing the filtered read signal to a predetermined threshold. In yet another embodiment, the step of processing the read signal to detect the previously written servo sector comprises the step of opening a detection window commensurate with the head approaching an expected circumferential location of a servo sector.

In still another embodiment, each servo sector comprises a track address and the step of writing servo sectors from the second diameter of the disk toward the middle diameter of the disk comprises the step of processing the read signal to detect the track address in the previously written servo sector. In one embodiment, the track addresses in the previously written servo sectors are processed to write the servo sectors that form a controlled overlap of servo tracks near the middle diameter of the disk.

Another embodiment of the present invention comprises a disk drive including a disk, a head actuated over the disk, and control circuitry operable to servo write the disk. The control circuitry is operable to write servo sectors to define servo tracks from a first diameter of the disk to substantially a middle diameter of the disk, wherein the first diameter is selected from one of the outer and inner diameter of the disk. Servo sectors are then written to define servo tracks from a second diameter of the disk toward the middle diameter of the disk by positioning the head over a current servo track, reading the current servo track to generate a read signal, processing the read signal to detect a previously written servo sector, and if a previously written servo sector is not detected, then writing servo sectors to the current servo track and positioning the head over a next servo track.

Another embodiment of the present invention comprises a method of servo writing a disk of a disk drive, the disk drive comprising the disk and a head actuated over the disk. A plurality of seed tracks are written to the disk. The seed tracks are then processed to write servo sectors to define servo tracks from a first diameter of the disk to substantially a middle diameter of the disk, wherein the first diameter is selected from one of the outer and inner diameter of the disk. The seed tracks are then processed to write servo sectors to define servo tracks from a second diameter of the disk toward the middle diameter of the disk, wherein the second diameter is selected from one of the outer and inner diameter of the disk.

Another embodiment of the present invention comprises a disk drive including a disk having a plurality of seed tracks, a head actuated over the disk, and control circuitry operable to servo write the disk. The control circuitry is operable to process the seed tracks to write servo sectors to define servo tracks from a first diameter of the disk to substantially a middle diameter of the disk, wherein the first diameter is selected from one of the outer and inner diameter of the disk. The seed tracks are then processed to write servo sectors to define servo tracks from a second diameter of the disk toward the middle diameter of the disk, wherein the second diameter is selected from one of the outer and inner diameter of the disk.

BRIEF DESCRIPTION OF THE DRAWINGS

FIGS. 2A-2C illustrate a prior art technique of servo writing a disk which exhibits an overwrite problem, particularly when employing perpendicular magnetic recording.

FIGS. 3A-3C illustrate a prior art technique for overcoming the overwrite problem by servo writing from the outer diameter to the middle diameter and then from the inner diameter to the middle diameter leaving a gap near the middle diameter.

FIG. 10A shows an embodiment of the present invention wherein a servo write clock is synchronized by clocking a modulo-N counter relative to when the sync marks in the spiral tracks are detected.

FIG. 10B shows an eye pattern generated by reading the spiral track, including the sync marks in the spiral track.

DESCRIPTION OF THE PREFERRED EMBODIMENTS

Figure 4:
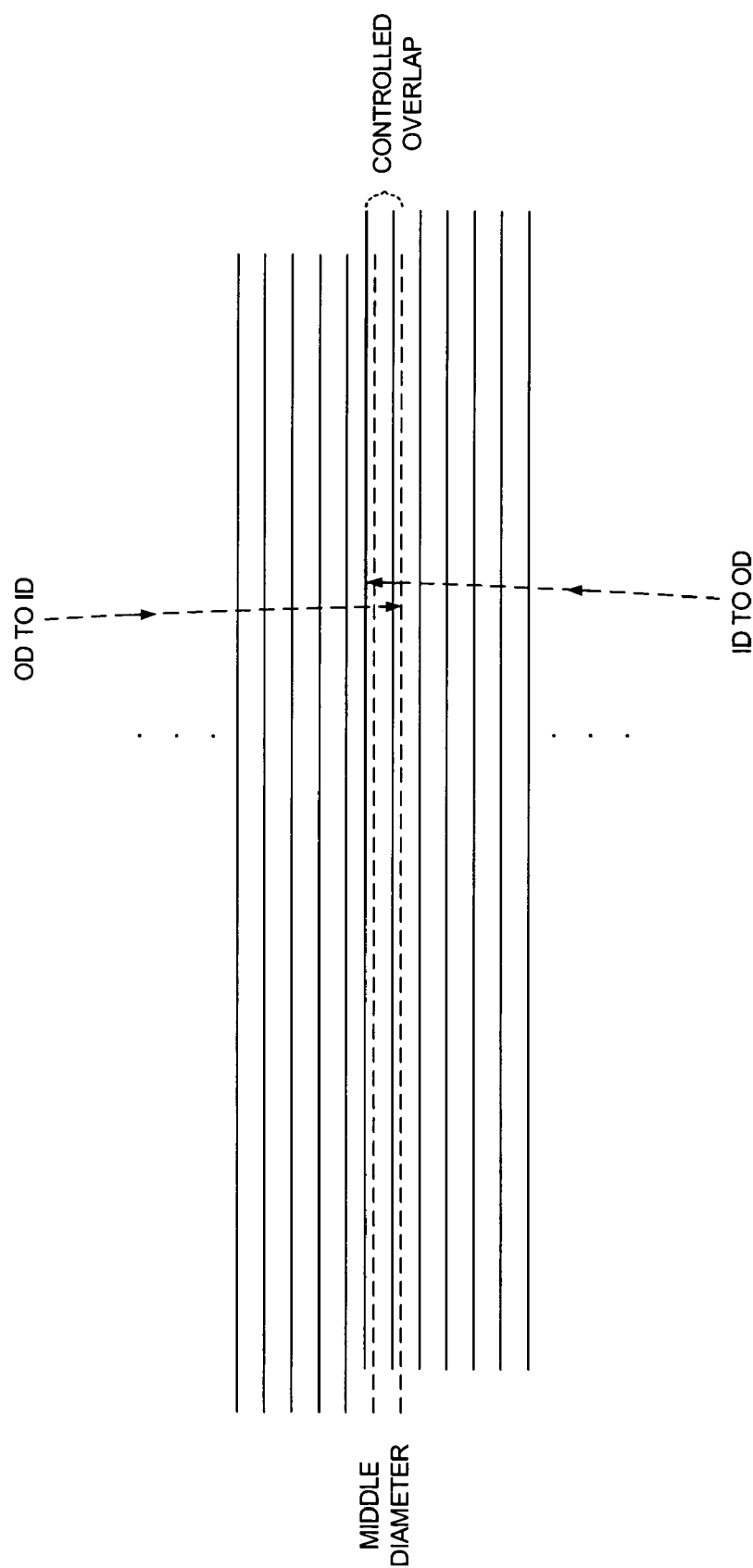
FIG. 4 shows an embodiment of the present invention wherein the servo sectors previously written to the disk are processed in order to write servo sectors that form a controlled overlap of servo tracks near the middle diameter of the disk.

FIG. 4 shows an embodiment of the present invention as a method of servo writing a disk of a disk drive, the disk drive comprising the disk and a head actuated over the disk. Servo sectors are written to define servo tracks from a first diameter of the disk to substantially a middle diameter of the disk, wherein the first diameter is selected from one of the outer and inner diameter of the disk. Servo sectors are then written to define servo tracks from a second diameter of the disk toward the middle diameter of the disk by positioning the head over a current servo track, reading the current servo track to generate a read signal, processing the read signal to detect a previously written servo sector, and if a previously written servo sector is not detected, then writing servo sectors to the current servo track and positioning the head over a next servo track.

In the embodiment of FIG. 4, the step of writing servo sectors from the second diameter of the disk toward the middle diameter of the disk comprises the step of continuing to write servo sectors to a predetermined number of servo tracks after detecting the previously written servo sector to form a controlled overlap of servo tracks near the middle diameter of the disk. Any suitable number of servo tracks may be written to overlap the previously written servo tracks. Overlapping the servo tracks near the middle diameter of the disk improves format efficiency by effectively eliminating the gap formed when servo writing the disk using the prior art technique shown in FIGS. 3A-3C.

Figure 5:
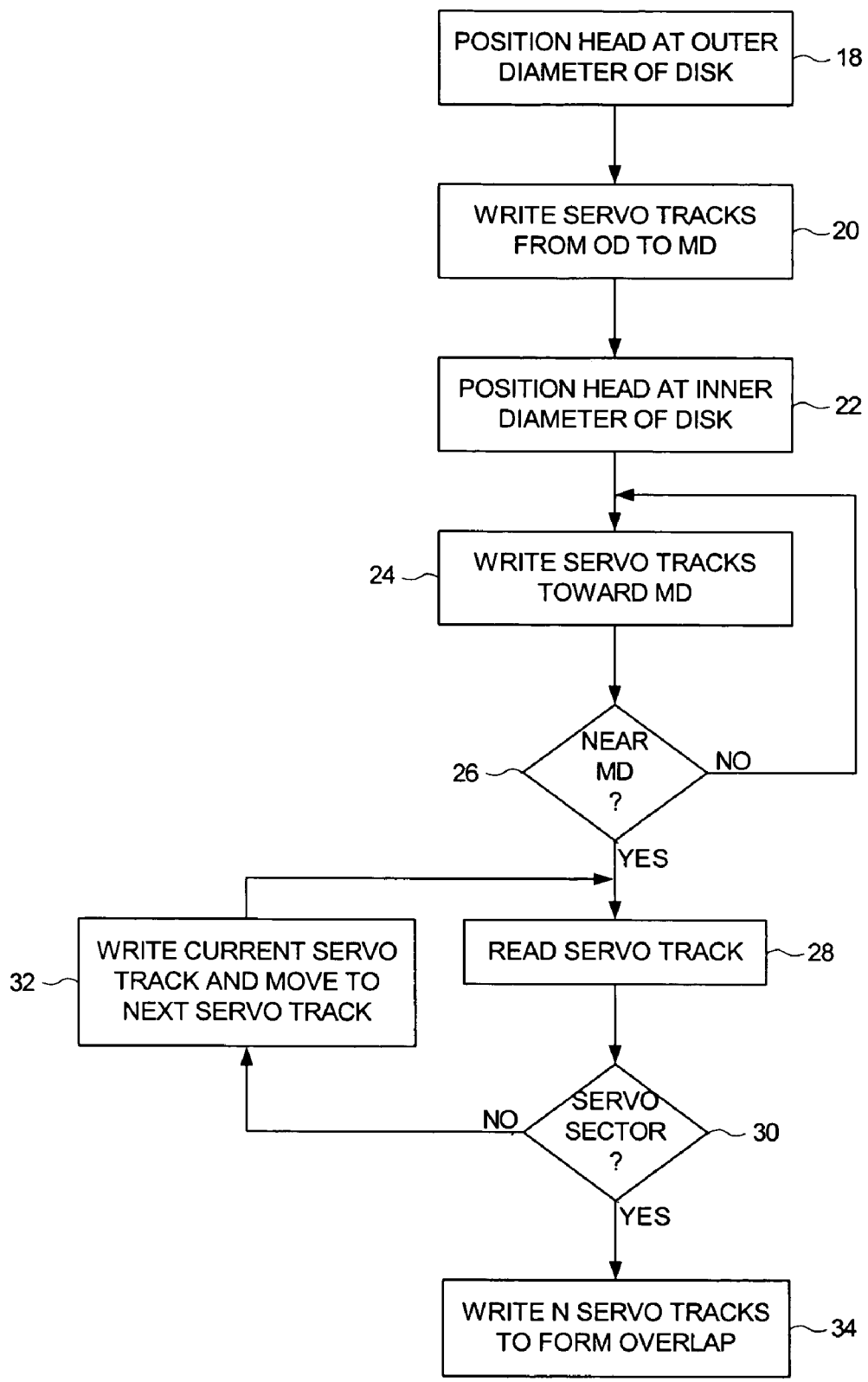
FIG. 5 shows a flow diagram according to an embodiment of the present invention for writing the servo sectors from the outer diameter toward the middle diameter, and from the inner diameter toward the middle diameter until a previously written servo sector is detected.

FIG. 5 is a flow diagram according to an embodiment of the present invention for servo writing the disk. At step 18 the head is positioned at the outer diameter of the disk, and at step 20 servo sectors are written to define servo tracks from the outer diameter of the disk to substantially a middle diameter of the disk. Thereafter at step 22 the head is positioned at the inner diameter of the disk, and at step 24 servo sectors are written to define servo tracks from the inner diameter of the disk toward the middle diameter of the disk. When the head nears the middle diameter of the disk at step 26, the current servo track is read using the head at step 28. If at step 30 a previously written servo sector is not detected at the current servo track, then at step 32 servo sectors are written to the current servo track and the head is positioned over a next servo track. This process is repeated until at step 30 a previously written servo sector is detected. Once a previously written servo sector is detected at step 30, at step 34 a predetermined number of servo tracks are written to form a controlled overlap of servo tracks near the middle diameter of the disk. In an alternative embodiment, the servo tracks are first written from the inner diameter of the disk to the middle diameter, and then from the outer diameter of the disk to the middle diameter.

Figure 6A:
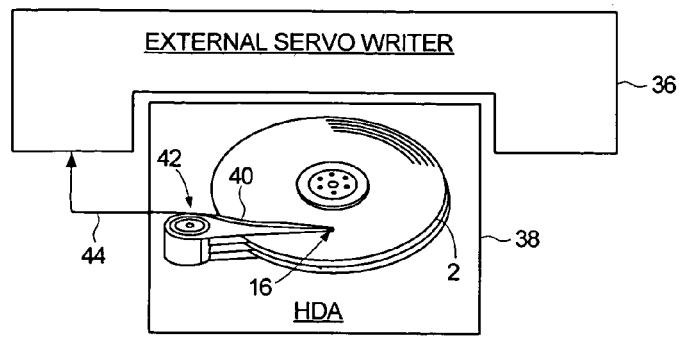
FIG. 6A shows an embodiment of the present invention wherein an external servo writer is used to servo write the disk.

FIG. 6A shows an embodiment of the present invention wherein an external servo writer 36 is used to servo write the disk 2. In this embodiment, the disk 2 and head 16 are enclosed in a head disk assembly (HDA) 38. The head 16 is coupled to the distal end of an actuator arm 40 which is rotated about a pivot by a voice coil motor (VCM) 42. In one embodiment, the external servo writer 36 generates suitable control signals applied to the VCM 42 while servo writing the disk 2, and in an alternative embodiment, the external servo writer 36 inserts a push pin into the HDA 38 for use in positioning the actuator arm 40 while servo writing the disk 2. The external servo writer 36 comprises suitable circuitry for detecting the position of the actuator arm 40 (e.g., using a laser interferometer) in order to implement a closed loop servo system. The external servo writer 36 also inserts a clock head into the HDA 38 for use in writing/reading a clock track. The clock track is read during the servo writing process in order to synchronize a servo write clock to the rotation of the disk 2. In the embodiment of FIG. 6A, the external servo writer 36 further comprises suitable circuitry for processing a read signal 44 emanating from the head 16 in order to detect the previously written servo sectors while servo writing from the inner diameter toward the middle diameter of the disk 2.

Figure 6B:
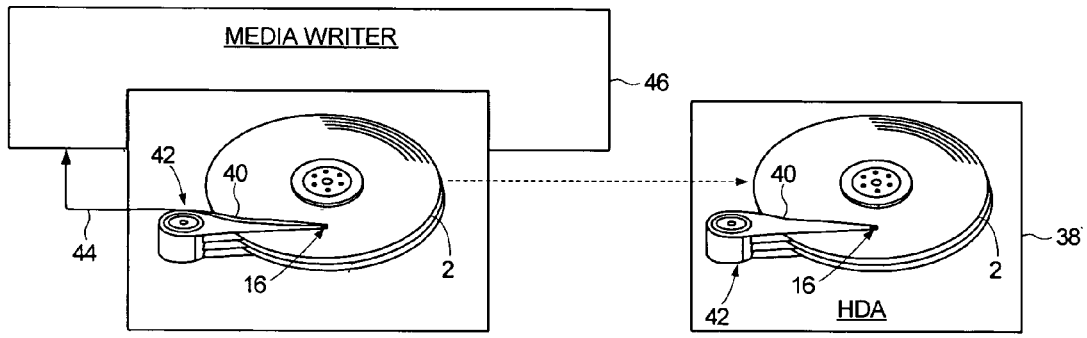
FIG. 6B shows an embodiment of the present invention wherein a media writer is used to servo write the disk.

FIG. 6B shows an alternative embodiment of the present invention wherein a media writer 46 is used to servo write one or more of the disks 2 which are then inserted into the HDA 38 of a product disk drive. The media writer 46 comprises one or more heads 16 attached to the distal ends of actuator arms 40, and a VCM 42 for rotating the actuator arms 40 about a pivot. The actuator arms 16 and VCM 42 may be the same or similar to the actuator arms 16 and VCM 42 employed in the HDA 38 of the product disk drive. The media writer 46 also comprises suitable circuitry for processing a read signal 44 emanating from the head 16 in order to detect the previously written servo sectors while servo writing from the inner diameter toward the middle diameter of the disk 2 in order to control the overlap of servo tracks near the middle diameter.

Figure 6C:
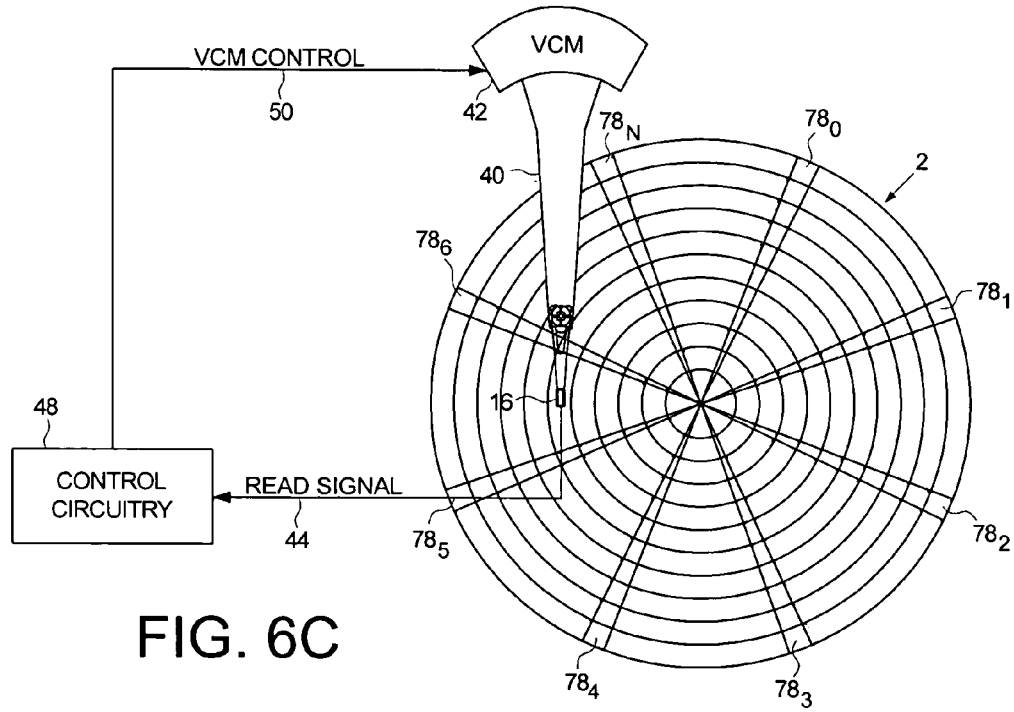
FIG. 6C shows an embodiment of the present invention wherein the control circuitry internal to the disk drive is used to servo write the disk.

FIG. 6C shows yet another embodiment of the present invention wherein the control circuitry 48 internal to the product disk drive is used to servo write the disk 2. The control circuitry 48 comprises suitable circuitry for processing the read signal 44 emanating from the head 16, and for generating a suitable control signal 50 applied to the VCM 42 for servoing the head 16. In one embodiment, the control circuitry 48 servo writes the disk 2 by propagating the servo sectors from servo track to servo track. In this embodiment, the control circuitry 48 reads a previously written servo track in order to derive position information for servoing the head 16 and synchronizing the servo write clock. In an alternative embodiment described below, seed tracks are written to the disk 2 which are read during the servo writing process to derive the position information used for servoing the head 16 and synchronizing the servo write clock. The control circuitry 48 also comprises suitable circuitry for detecting the previously written servo sectors while servo writing from the inner diameter toward the middle diameter of the disk 2 in order to control the overlap of servo tracks near the middle diameter.

Any suitable control circuitry 48 may be employed to implement the embodiments of the present invention. In one embodiment, the control circuitry 48 comprises a microprocessor executing instructions, the instructions being operable to cause the microprocessor to perform the steps of FIG. 5 as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 2 and read into a volatile semiconductor memory when the disk drive is powered on. In yet another embodiment, the control circuitry 48 comprises suitable logic circuitry, such as state machine circuitry.

Figure 7A:
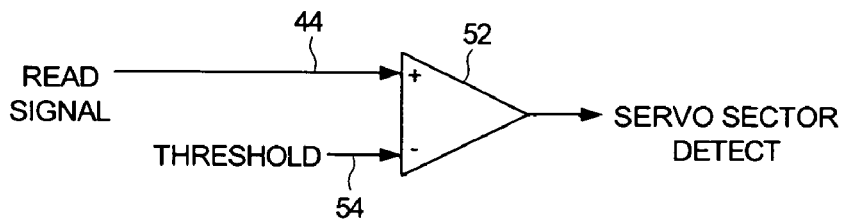
FIG. 7A shows circuitry for detecting a previously written servo sector by comparing the read signal to a threshold according to an embodiment of the present invention.
Figure 7B:
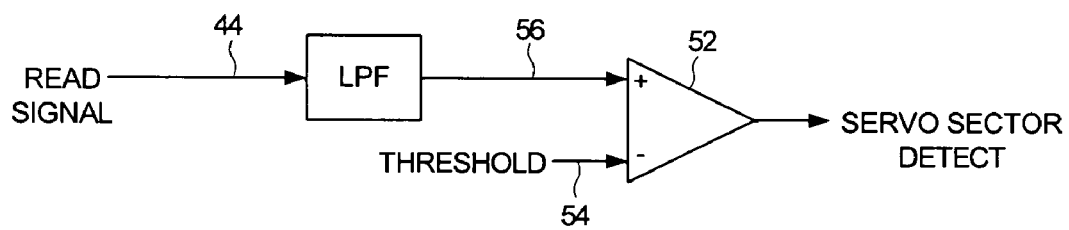
FIG. 7B shows circuitry for detecting a previously written servo sector by low pass filtering the read signal and comparing the filtered read signal to a threshold according to an embodiment of the present invention.
Figure 7C:
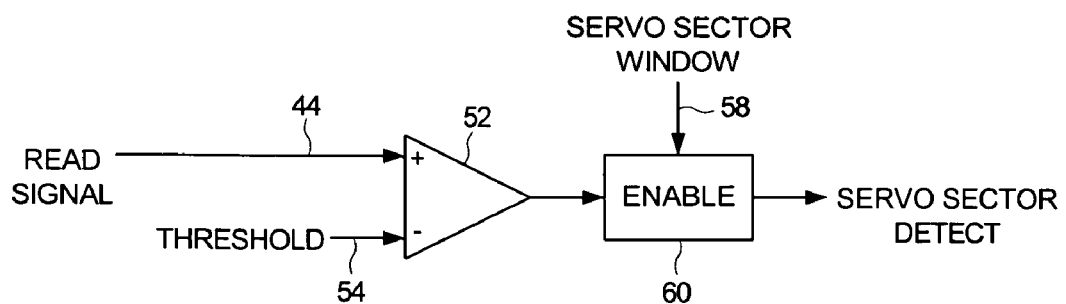
FIG. 7C shows circuitry for detecting a previously written servo sector by enabling a detection window commensurate with the head approaching an expected circumferential location of a servo sector according to an embodiment of the present invention.

Any suitable technique may be employed for detecting a previously written servo sector while servo writing from the inner diameter toward the middle diameter of the disk 2. In an embodiment shown in FIG. 7A, a comparator 52 compares the read signal 44 to a predetermined threshold 54 in order to detect the presence of a previously written servo sector. FIG. 7B shows an alternative embodiment wherein the read signal 44 is low-pass filtered, and the filtered read signal 56 compared to the threshold 54 by the comparator 52. In yet another embodiment shown in FIG. 7C, a detection window is opened commensurate with the head 16 approaching an expected circumferential location of a servo sector as determined by the servo write clock. In the embodiment of FIG. 7C, the detection window 58 enables 60 the output of comparator 52.

Figure 1:
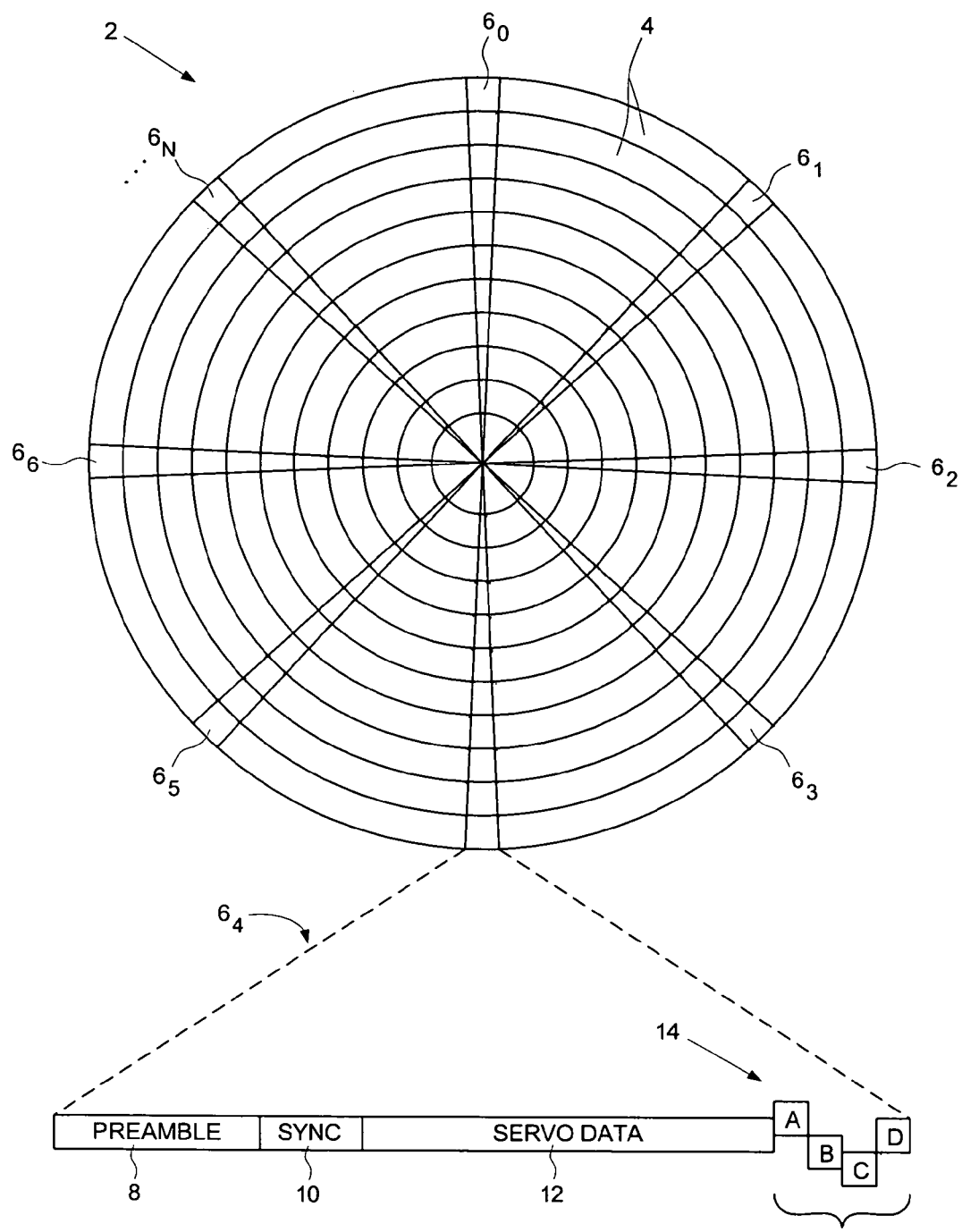
FIG. 1 shows a prior art disk format comprising a plurality of radially spaced, concentric servo tracks defined by a plurality of servo sectors.
Figure 8:
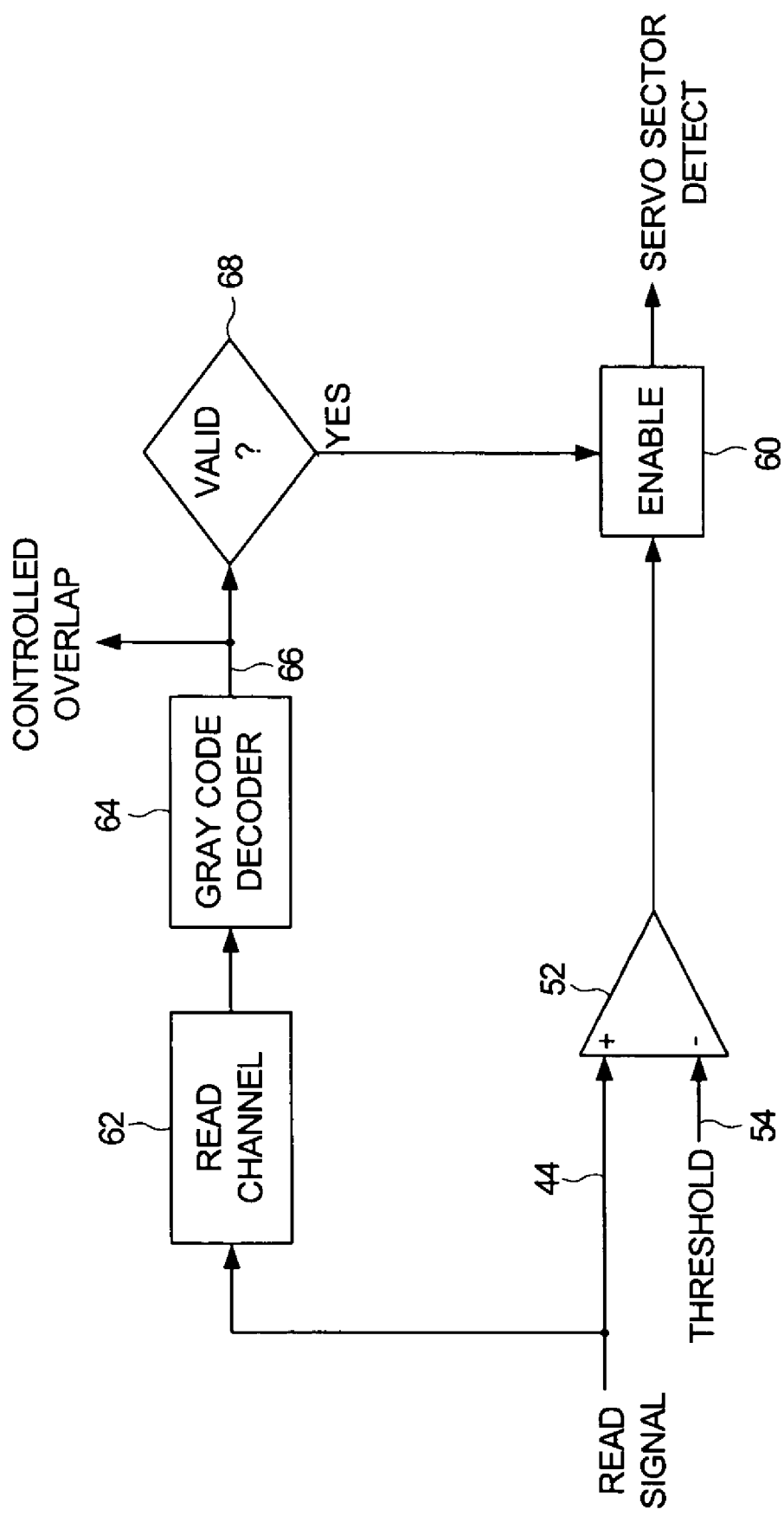
FIG. 8 shows an embodiment of the present invention wherein the track address in a previously written servo sector is used to enable the servo sector detector as well as control the overlap of servo tracks near the middle diameter of the disk.

In another embodiment of the present invention, each servo sector comprises a track address (e.g., a Gray coded track address in the servo data field 12 of FIG. 1) and the step of writing servo sectors from the second diameter of the disk toward the middle diameter of the disk comprises the step of processing the read signal to detect the track address in the previously written servo sector. In one embodiment, the servo sector detector is enabled only if the detected track address is valid. In another embodiment, the track addresses in the previously written servo sectors are processed to write servo sectors that form the controlled overlap of servo tracks near the middle diameter of the disk. FIG. 8 shows suitable circuitry for implementing this embodiment of the present invention including a read channel 62 for processing the read signal 44 to detect the Gray coded track address, and a Gray code decoder 64 for decoding the Gray coded track address into a decoded track address 66. If at step 68 the decoded track address 66 is valid (i.e., corresponds to a track address near the middle diameter of the disk), then the comparator 52 is enabled 60. The decoded track address 66 is also processed by other control circuitry in order to control the overlap of servo tracks near the middle diameter of the disk. For example, in one embodiment the servo writing process continues at step 34 of FIG. 5 until a predetermined decoded track address 66 is detected in a previously written servo sector.

Figure 9A:
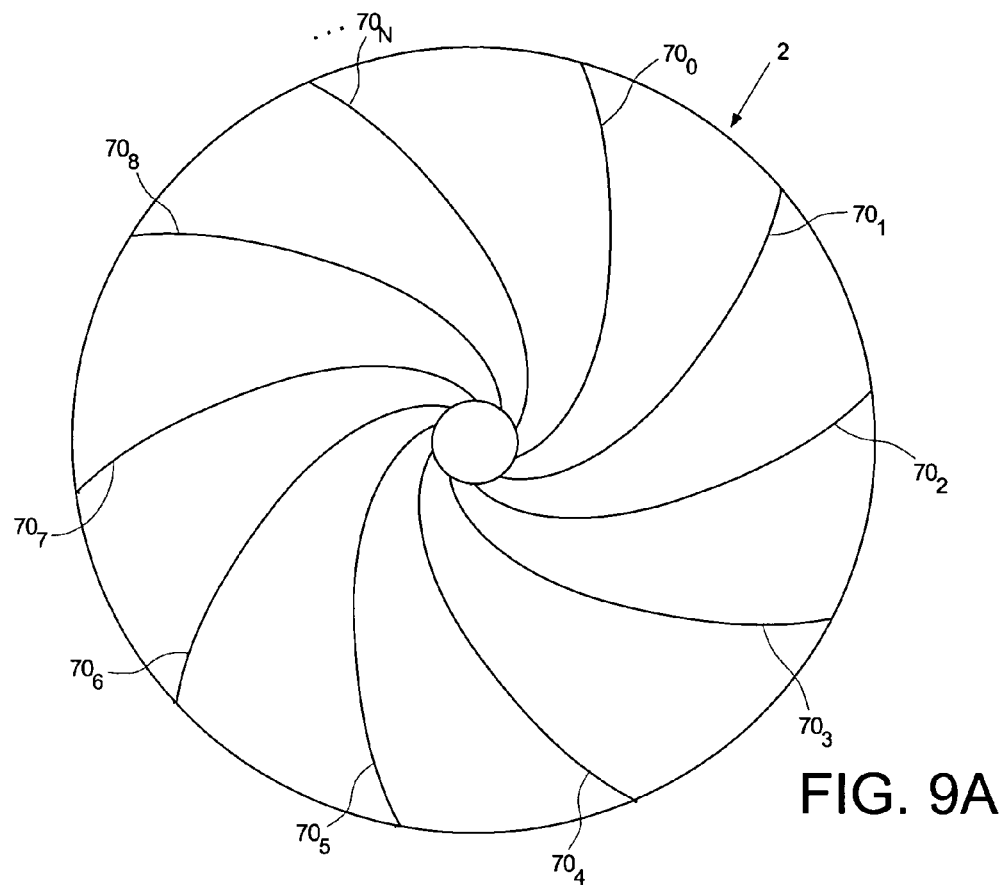
FIG. 9A illustrates an embodiment of the present invention wherein a plurality of seed tracks in the form of spiral tracks are written to the disk for use in writing the servo sectors to the disk.
Figure 9B:
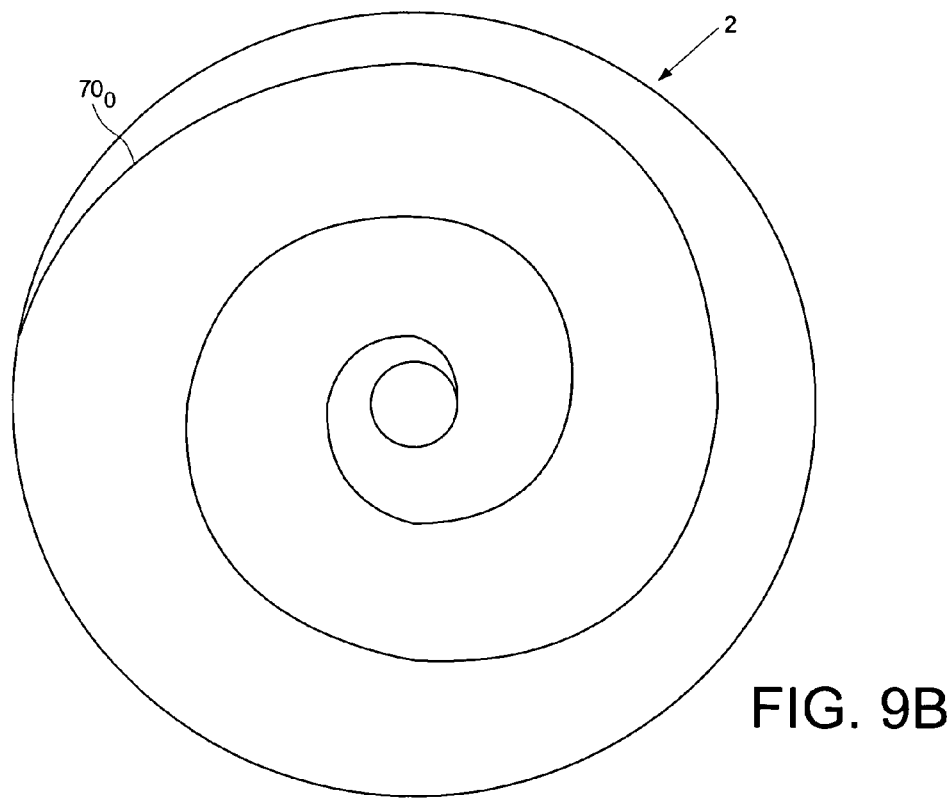
FIG. 9B illustrates an embodiment of the present invention wherein each spiral track is written over multiple revolutions of the disk.

In another embodiment of the present invention, a plurality of seed tracks are written to the disk which are then processed to servo write the disk. For example, the seed tracks are processed to generate the position information used to servo the head as well as to synchronize a servo write clock. In addition, the seed tracks may be processed to control the amount of overlap of servo tracks at the middle diameter of the disk. FIG. 9A shows an embodiment wherein the seed tracks comprise a plurality of spiral tracks $70_0$-$70_N$, wherein each spiral track comprises a high frequency signal 72 interrupted by a sync mark 74 at a sync mark interval (FIG. 10B). In the embodiment of FIG. 9A, each spiral track $70_i$ is written over a partial revolution of the disk. In another embodiment shown in FIG. 9B, each spiral track $70_i$ is written over multiple revolutions of the disk. The seed tracks (e.g., spiral tracks) may be written to the disk using any suitable technique, such as with an external servo writer, a media writer, or self-servo written using the control circuitry 48 internal to the product disk drive.

After writing the spiral tracks $70_0$-$70_N$ to the disk, the product servo sectors are written to the disk 18 during a "fill operation". In one embodiment, the control circuitry 48 within the product disk drive is used to process the spiral tracks $70_0$-$70_N$ in order to write the product servo sectors to the disk. In an alternative embodiment described below with reference to FIGS. 13 and 14, an external product servo writer is used to process the spiral tracks $70_0$-$70_N$ in order to write the product servo sectors to the disk.

FIG. 10B illustrates an "eye" pattern in the read signal that is generated when the head 16 passes over a spiral track 70. The read signal representing the spiral track comprises high frequency transitions 72 interrupted by sync marks 74. When the head 16 moves in the radial direction, the eye pattern will shift (left or right) while the sync marks 74 remain fixed. The shift in the eye pattern (detected from the high frequency signal 72) relative to the sync marks 74 provides the off-track information (position error signal or PES) for servoing the head 16.

FIG. 10A shows an embodiment of the present invention wherein a saw-tooth waveform 76 is generated by clocking a modulo-N counter with a servo write clock, wherein the frequency of the servo write clock is adjusted until the sync marks 74 in the spiral tracks $70_0$-$70_N$ are detected at a target modulo-N count value. The servo write clock may be generated using any suitable circuitry, such as a phase locked loop (PLL). As each sync mark 74 in the spiral tracks $70_0$-$70_N$ is detected, the value of the modulo-N counter represents the phase error for adjusting the PLL. In one embodiment, the PLL is updated when any one of the sync marks 74 within the eye pattern is detected. In this manner the multiple sync marks 74 in each eye pattern (each spiral track crossing) provides redundancy so that the PLL is still updated if one or more of the sync marks 74 are missed due to noise in the read signal. Once the sync marks 74 are detected at the target modulo-N counter values, the servo write clock is coarsely locked to the desired frequency for writing the product servo sectors to the disk.

The sync marks 74 in the spiral tracks $70_0$-$70_N$ may comprise any suitable pattern, and in one embodiment, a pattern that is substantially shorter than the sync mark 10 in the conventional product servo sectors of FIG. 1. A shorter sync mark 74 allows the spiral tracks $70_0$-$70_N$ to be written to the disk using a steeper slope (by moving the head faster from the outer diameter to the inner diameter of the disk) which reduces the time required to write each spiral track $70_0$-$70_N$.

In one embodiment, the servo write clock is further synchronized by generating a timing recovery measurement from the high frequency signal 72 between the sync marks 74 in the spiral tracks $70_0$-$70_N$. Synchronizing the servo write clock to the high frequency signal 72 helps maintain proper radial alignment (phase coherency) of the Gray coded track addresses in the product servo sectors. The timing recovery measurement may be generated in any suitable manner. In one embodiment, the servo write clock is used to sample the high frequency signal 72 and the signal sample values are processed to generate the timing recovery measurement. The timing recovery measurement adjusts the phase of the servo write clock (PLL) so that the high frequency signal 72 is sampled synchronously. In this manner, the sync marks 74 provide a coarse timing recovery measurement and the high frequency signal 72 provides a fine timing recovery measurement for maintaining synchronization of the servo write clock.

Figure 11:
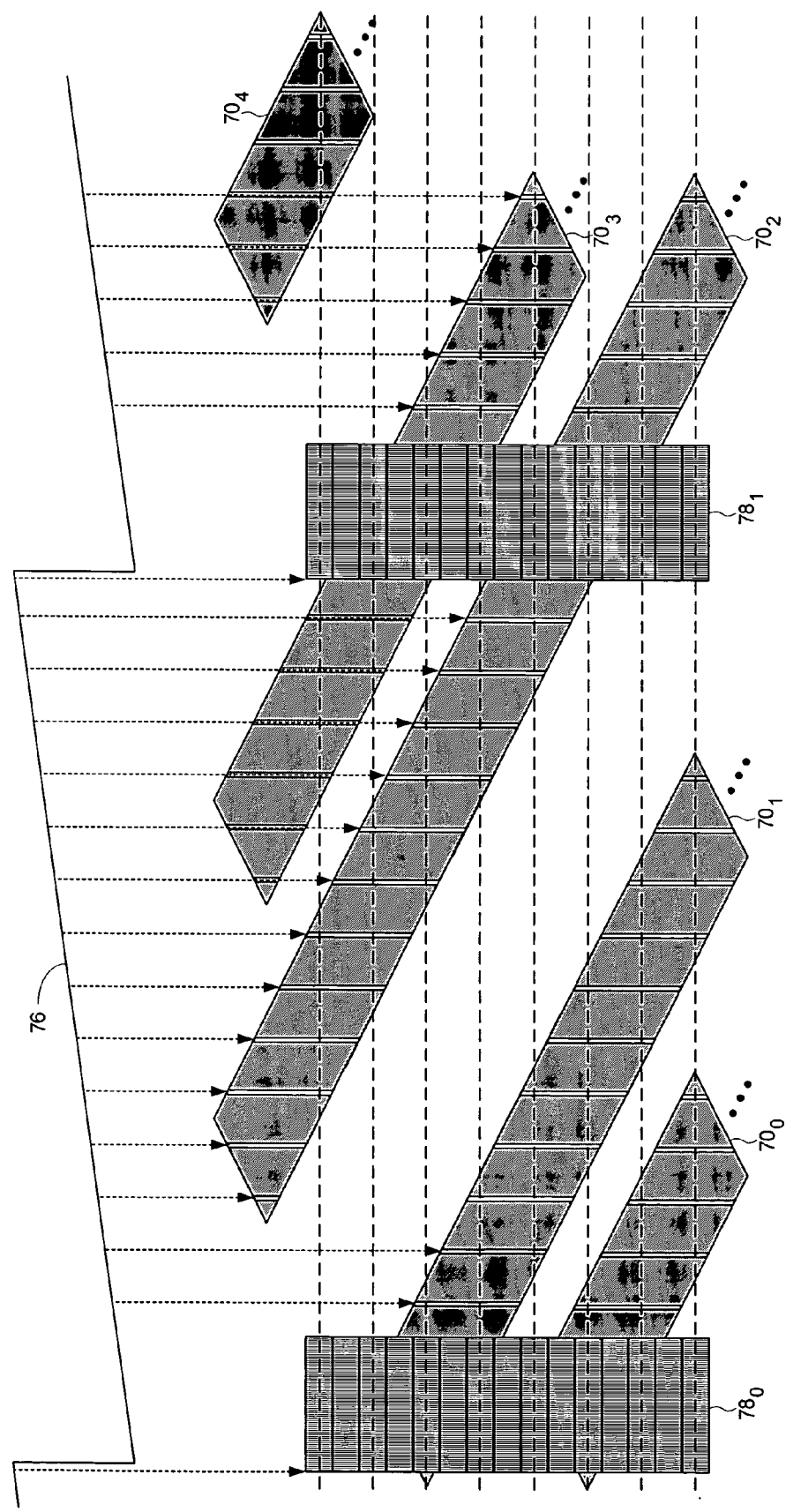
FIG. 11 illustrates writing of servo sectors using a servo write clock generated from reading the spiral tracks.

FIG. 11 illustrates how the product servo sectors $78_0$-$78_N$ are written to the disk after synchronizing the servo write clock in response to the high frequency signal 72 and the sync marks 74 in the spiral tracks $70_0$-$70_N$. In the embodiment of FIG. 11, the dashed lines represent the centerlines of the data tracks. The sync marks in the spiral tracks $70_0$-$70_N$ are written so that there is a shift of two sync marks 74 in the eye pattern (FIG. 10B) between data tracks. In an alternative embodiment, the sync marks 74 in the spiral tracks $70_0$-$70_N$ are written so that there is a shift of N sync marks in the eye pattern between data tracks. In the embodiment of FIG. 11, the data tracks are narrower than the spiral tracks 70, however, in an alternative embodiment the data tracks are wider than or proximate the width of the spiral tracks 70.

Once the head 16 is tracking on a servo track, the product servo sectors $78_0$-$78_N$ are written to the disk using the servo write clock. Write circuitry is enabled when the modulo-N counter reaches a predetermined value, wherein the servo write clock clocks the write circuitry to write the product servo sector 78 to the disk. The spiral tracks $70_0$-$70_N$ on the disk are processed in an interleaved manner to account for the product servo sectors $78_0$-$78_N$ overwriting a spiral track. For example, when writing the product servo sectors $78_1$ to the disk, spiral track $70_2$ is processed initially to generate the PES tracking error and the timing recovery measurement. When the product servo sectors $78_1$ begin to overwrite spiral track $70_2$, spiral track $70_3$ is processed to generate the PES tracking error and the timing recovery measurement. In the embodiment of FIG. 11, the spiral tracks 70 are written as pairs to facilitate the interleave processing; however, the spiral tracks may be written using any suitable spacing (e.g., equal spacing) while still implementing the interleaving aspect.

Figure 12A:
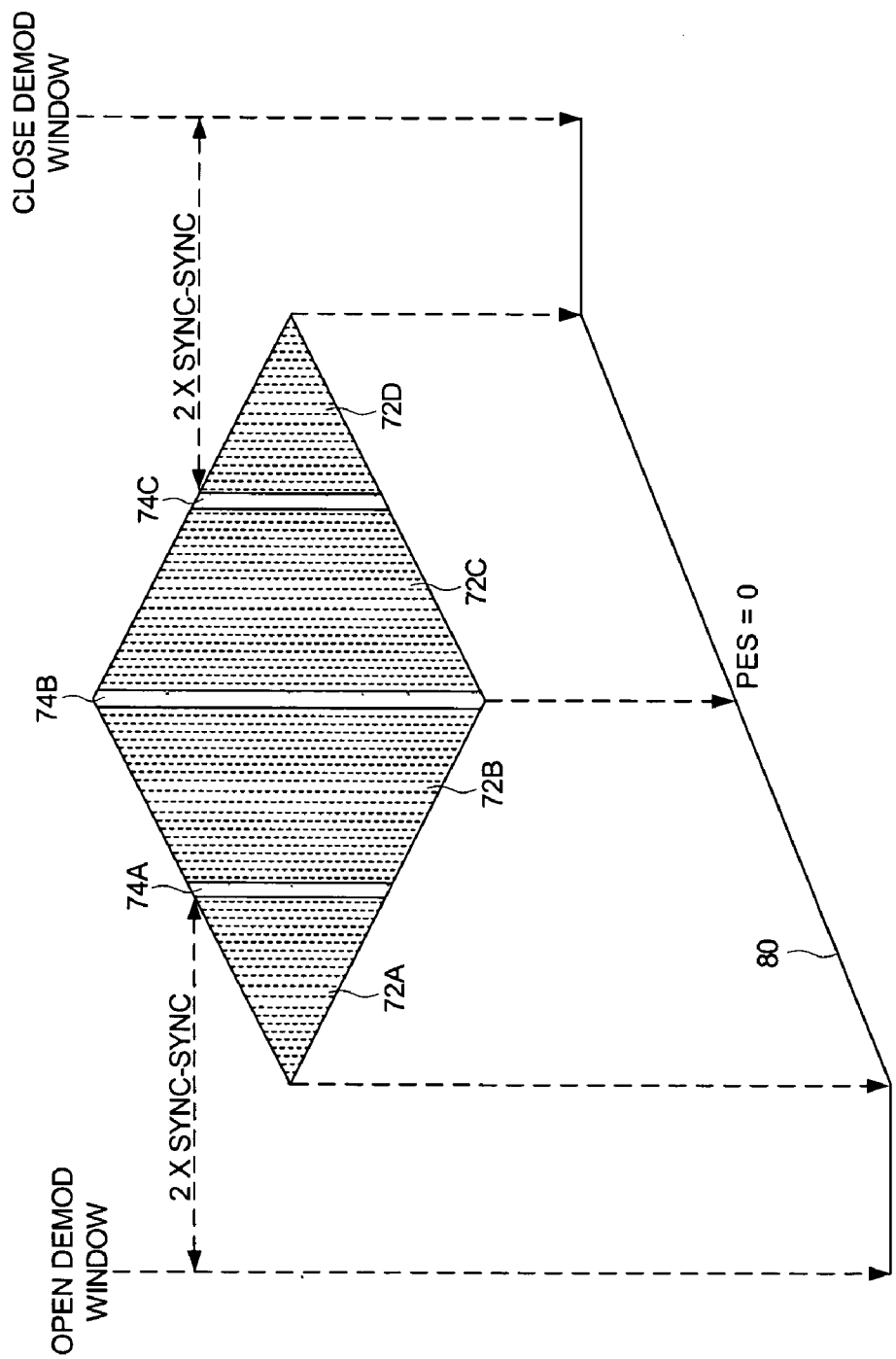
FIG. 12A illustrates an embodiment of the present invention wherein the high frequency signal in the spiral tracks is demodulated by integrating the read signal over a demodulation window and generating the PES relative to a target sync mark and a reference point on the resulting ramp signal.
Figure 12B:
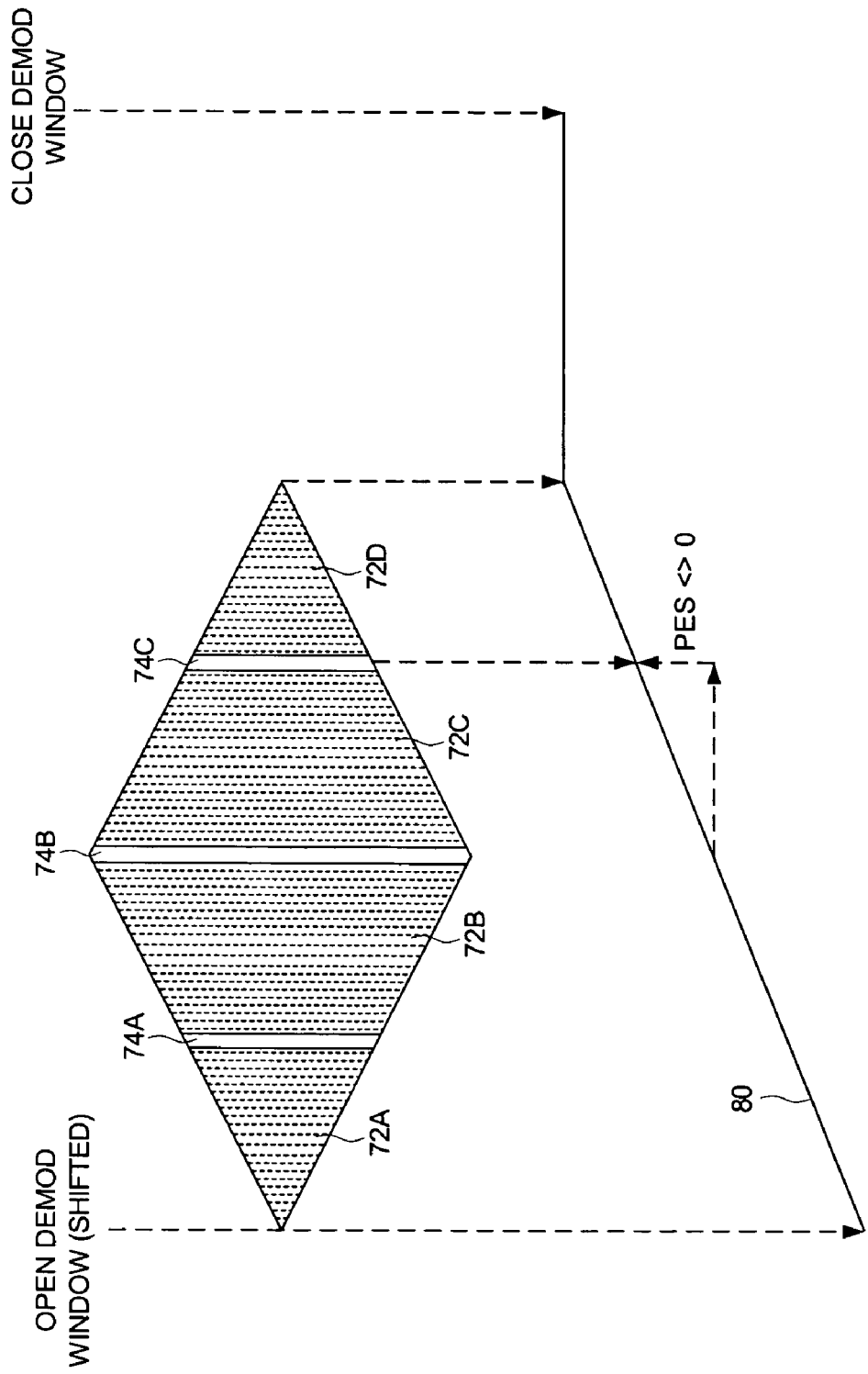
FIG. 12B illustrates initiating a seek operation by shifting the demodulation window an integer number of sync marks to generate a non-zero PES.

FIG. 12A shows an embodiment of the present invention wherein the high frequency signal 72 in a spiral track 70 is demodulated by integrating the read signal to generate a ramp signal 80. The PES is generated relative to a target sync mark 74 in the spiral track 70 and a reference point of the ramp signal 80. In the embodiment of FIG. 12A, there are three sync marks 74A-74C in each spiral track crossing (each eye pattern) and the PES is generated as the deviation of the middle sync mark 74B from the center of the ramp signal 80. This deviation can be computed as the difference in the amplitude of the ramp signal 80 when the middle sync mark 74B is detected, or the difference in time between when the middle sync mark 74B is detected and the middle of the ramp signal 80. Also in this embodiment, the demodulation window is opened a number of sync mark intervals preceding the expected spiral track crossing (one sync mark interval in this example) and closed a number of sync mark intervals after the expected spiral track crossing (one sync mark interval in this example). In one embodiment, the ramp signal 80 is generated by integrating the high frequency signal 72 between the sync marks 74; that is, integration windows within the demodulation window are generated corresponding to the segments of high frequency signal 72 between each sync mark 74 (as determined from servo write clock). FIG. 12B illustrates a seek operation by shifting the demodulation window one sync mark interval to generate a non-zero PES which causes the head 16 to move toward the next servo track. The head 16 is moved radially so that the eye pattern shifts until sync mark 74C is detected in the middle of the eye pattern corresponding to the middle of the ramp signal 80.

Figure 13:
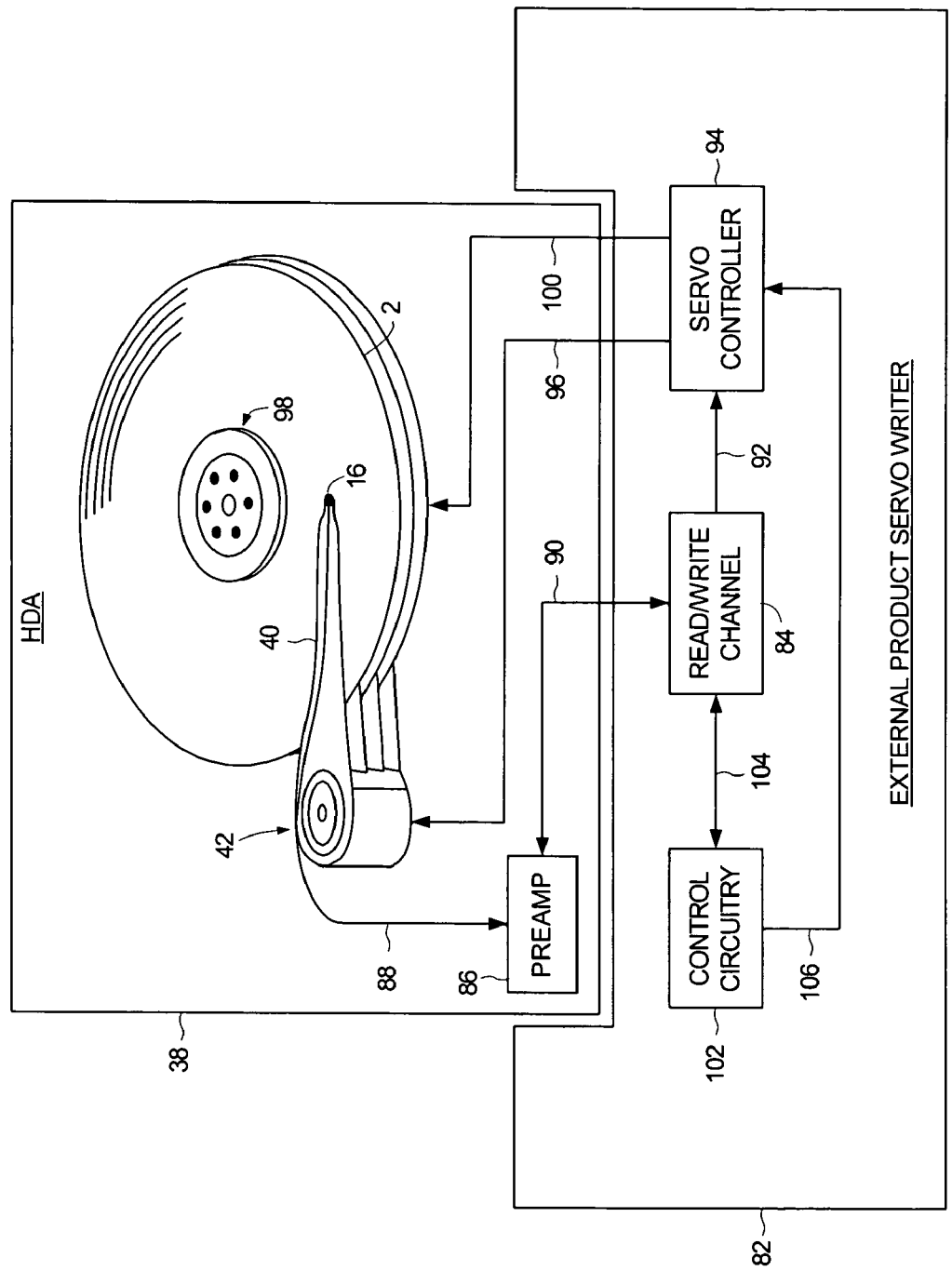
FIG. 13 shows an embodiment of the present invention wherein an external product servo writer is used to process the spiral tracks in order to write the servo sectors to the disk.
Figure 14:
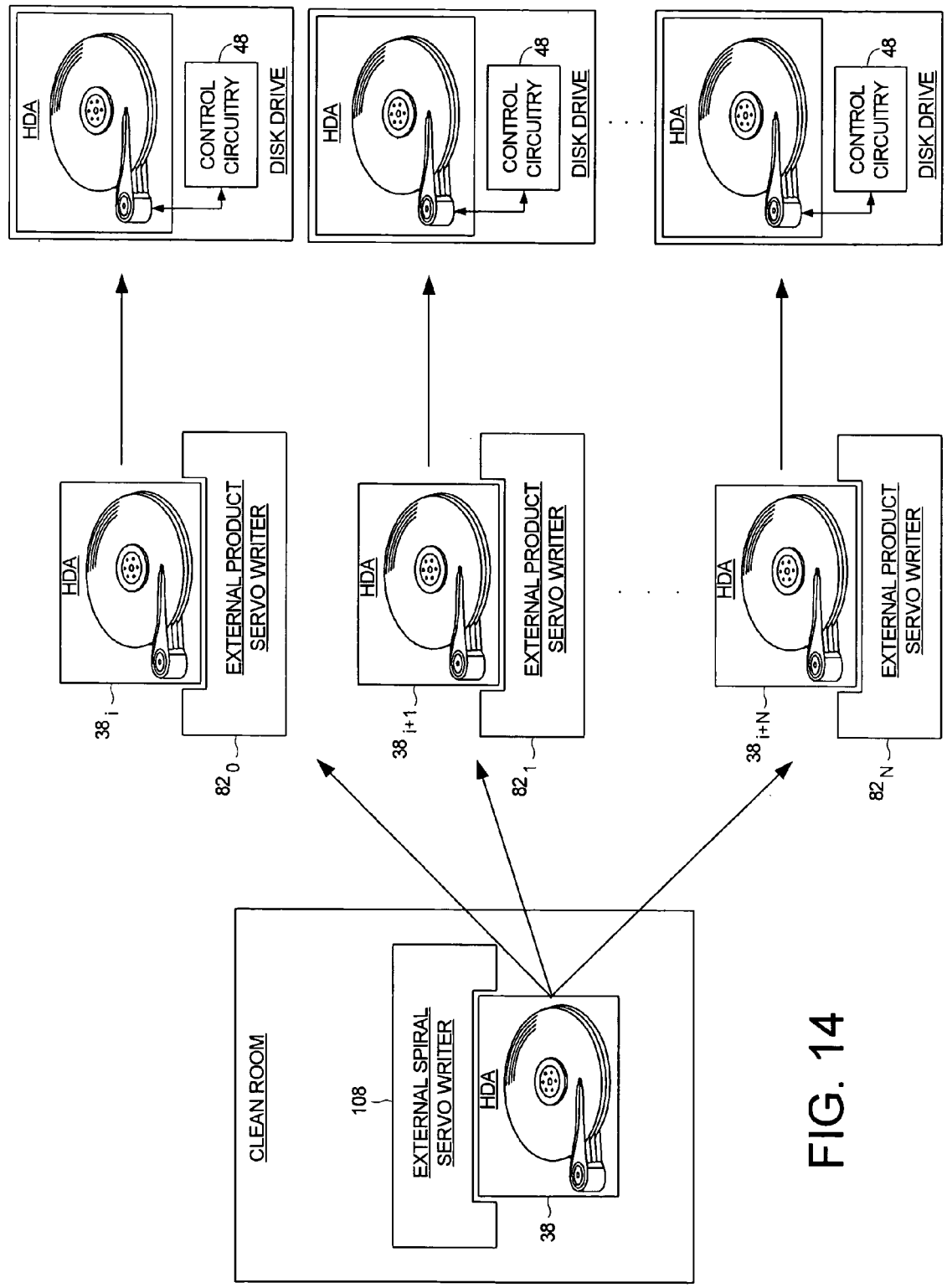
FIG. 14 shows an embodiment of the present invention wherein an external spiral servo writer is used to write the spiral tracks, and a plurality of external product servo writers write the servo sectors for the HDAs output by the external spiral servo writer.

FIG. 13 shows an embodiment of the present invention wherein after writing the spiral tracks $70_0$-$70_N$ to the disk, the HDA 38 is inserted into an external product servo writer 82 comprising suitable circuitry for reading and processing the spiral tracks $70_0$-$70_N$ in order to write the product servo sectors $78_0$-$78_N$ to the disk. The external product servo writer 82 comprises a read/write channel 84 for interfacing with a preamp 86 in the HDA 38. The preamp 86 amplifies a read signal emanating from the head 16 over line 88 to generate an amplified read signal applied to the read/write channel 84 over line 90. The read/write channel 84 comprises circuitry for generating servo burst signals 92 applied to a servo controller 94. The servo controller 94 processes the servo burst signals 92 to generate the PES. The PES is processed to generate a VCM control signal applied to the VCM 42 over line 96 in order to maintain the head 16 along a circular path while writing the product servo sectors $78_0$-$78_N$. The servo controller 94 also generates a spindle motor control signal applied to a spindle motor 98 over line 100 to maintain the disk at a desired angular velocity. Control circuitry 102 processes information received from the read/write channel 84 over line 104 associated with the spiral tracks $70_0$-$70_N$ (e.g., timing information) and provides the product servo sector data to the read/write channel 84 at the appropriate time. The product servo sector data is provided to the preamp 86 which modulates a current in the head 16 in order to write the product servo sectors $78_0$-$78_N$ to the disk. The control circuitry 102 also transmits control information over line 106 to the servo controller 94 such as the target servo track to be written. After writing the product servo sectors $78_0$-$78_N$ to the disk, the HDA 38 is removed from the external product servo writer 82 and a printed circuit board assembly (PCBA) comprising the control circuitry 48 is mounted to the HDA 38.

Figure 15:
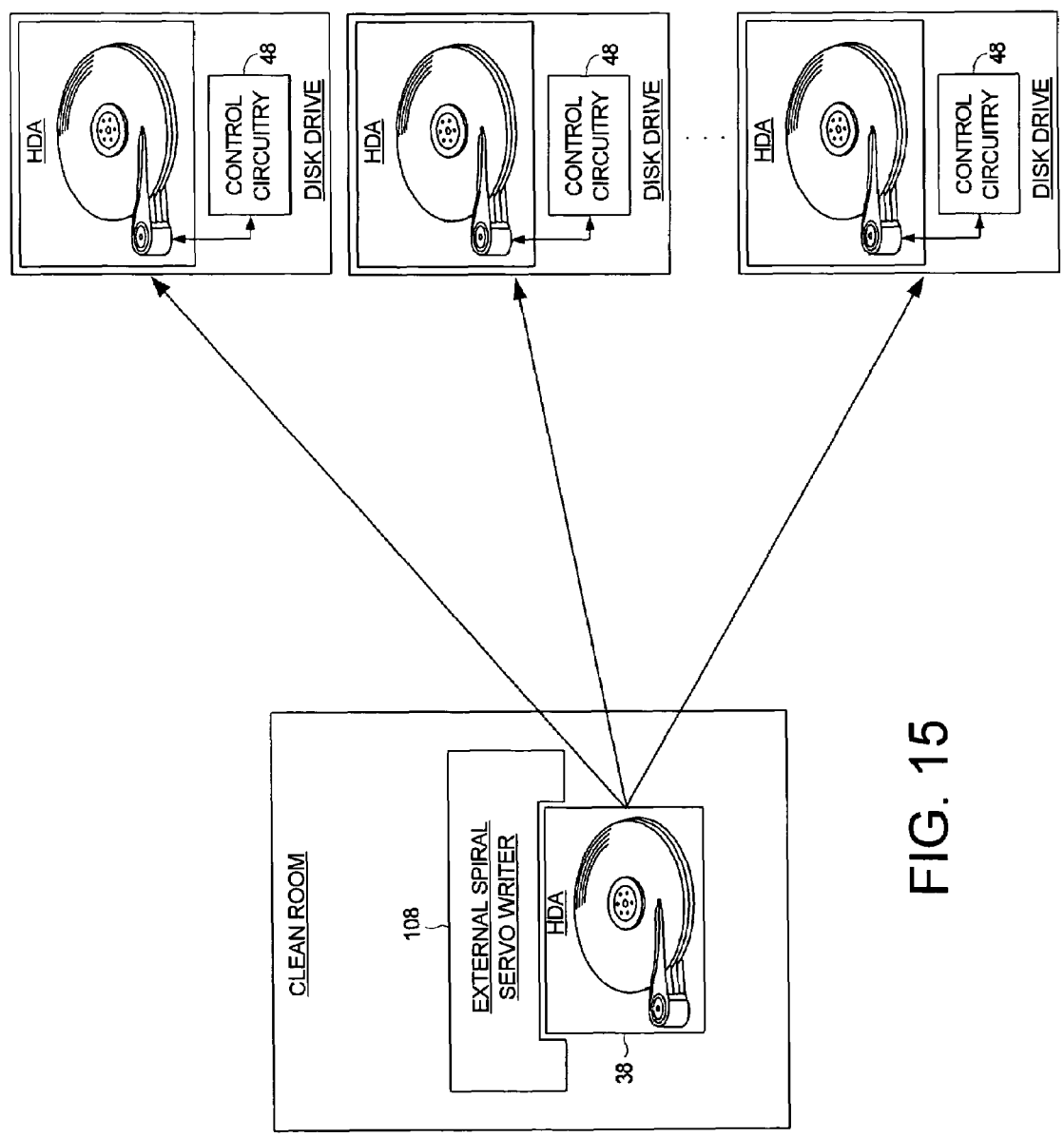
FIG. 15 shows an embodiment of the present invention wherein an external spiral servo writer is used to write the spiral tracks, and the control circuitry within each product disk drive is used to write the servo sectors to the disk.

In one embodiment, the external product servo writer 82 of FIG. 13 interfaces with the HDA 38 over the same connections as the control circuitry 48 to minimize the modifications needed to facilitate the external product servo writer 82. The external product servo writer 82 is less expensive than a conventional servo writer because it does not require a clean room or sophisticated head positioning mechanics. In an embodiment shown in FIG. 14, a plurality of external product servo writers $82_0$-$82_N$ process the HDAs $38_i$-$38_{i+N}$ output by an external spiral servo writer 108 in order to write the product servo sectors less expensively and more efficiently than a conventional servo writer. In an alternative embodiment shown in FIG. 15, an external spiral servo writer 108 is used to write the spiral tracks $70_0$-$70_N$, and the control circuitry 48 within each product disk drive is used to write the product servo sectors $78_0$-$78_N$.

In one embodiment, the entire seed track is read from the outer to inner diameter of the disk at the beginning of the servo writing operation to determine the maximum number of servo tracks to be written. Half of the maximum number of servo tracks are then written from the outer to middle diameter of the disk, and then half of the maximum number of server tracks are written from the inner diameter to the middle diameter (plus a predetermined additional N number of servo tracks in order to form the controlled overlap of servo tracks near the middle diameter of the disk).

We claim:

1. A method of servo writing a disk of a disk drive, the disk drive comprising the disk and a head actuated over the disk, the method comprising the steps of:
    writing first servo sectors in a first radial direction to define servo tracks from a first diameter of the disk to substantially a middle diameter of the disk; and
    writing second servo sectors in a second radial direction opposite the first radial direction to define servo tracks from a second diameter of the disk toward the middle diameter of the disk, the step of writing the second servo sectors comprising the steps of:
        positioning the head over a current servo track;
        reading the current servo track to generate a read signal;
        processing the read signal to detect one of the previously written first servo sectors; and
        if one of the previously written first servo sectors is not detected, writing second servo sectors to the current servo track and positioning the head over a next servo track.

2. The method as recited in claim 1, wherein the step of writing the second servo sectors from the second diameter of the disk toward the middle diameter of the disk comprises the step of continuing to write the second servo sectors to a predetermined number of servo tracks after detecting the previously written first servo sector to form a controlled overlap of servo tracks near the middle diameter of the disk.

3. The method as recited in claim 1, wherein an external servo writer is used to servo write the disk.

4. The method as recited in claim 1, wherein a media writer is used to servo write the disk.

5. The method as recited in claim 1, wherein control circuitry internal to the disk drive is used to servo write the disk.

6. The method as recited in claim 1, wherein the step of processing the read signal to detect the previously written first servo sector comprises the step of comparing the read signal to a predetermined threshold.

7. The method as recited in claim 1, wherein the step of processing the read signal to detect the previously written first servo sector comprises the steps of:
    filtering the read signal with a low pass filter to generate a filtered read signal; and
    comparing the filtered read signal to a predetermined threshold.

8. The method as recited in claim 1, wherein the step of processing the read signal to detect the previously written first servo sector comprises the step of opening a detection window commensurate with the head approaching an expected circumferential location of one of the first servo sectors.

9. The method as recited in claim 1, wherein each of the first servo sector sectors comprises a track address and the step of writing the second servo sectors from the second diameter of the disk toward the middle diameter of the disk comprises the step of processing the read signal to detect the track address in one of the previously written first servo sectors.

10. The method as recited in claim 9, further comprising the step of processing the track addresses in the previously written first servo sectors to write the second servo sectors to form a controlled overlap of servo tracks near the middle diameter of the disk.

11. A disk drive comprising:
    (a) a disk;
    (b) a head actuated over the disk; and
    (c) control circuitry operable to:
        write first servo sectors in a first radial direction to define servo tracks from a first diameter of the disk to substantially a middle diameter of the disk; and
        write second servo sectors in a second radial direction opposite the first radial direction to define servo tracks from a second diameter of the disk toward the middle diameter of the disk, the control circuitry operable to write the second servo sectors by:
            positioning the head over a current servo track;
            reading the current servo track to generate a read signal;
            processing the read signal to detect one of the previously written first servo sectors; and
            if one of the previously written first servo sectors is not detected, writing second servo sectors to the current servo track and positioning the head over a next servo track.

12. The disk drive as recited in claim 11, wherein the control circuitry is operable to write the second servo sectors from the second diameter of the disk toward the middle diameter of the disk by continuing to write the second servo sectors to a predetermined number of servo tracks after detecting the previously written first servo sector to form a controlled overlap of servo tracks near the middle diameter of the disk.

13. The disk drive as recited in claim 11, wherein the control circuitry is operable to detect the previously written first servo sector by comparing the read signal to a predetermined threshold.

14. The disk drive as recited in claim 11, wherein the control circuitry is operable to detect the previously written first servo sector by:
    filtering the read signal with a low pass filter to generate a filtered read signal; and
    comparing the filtered read signal to a predetermined threshold.

15. The disk drive as recited in claim 11, wherein the control circuitry is operable to detect the previously written first servo sector by opening a detection window commensurate with the head approaching an expected circumferential location of a servo sector.

16. The disk drive as recited in claim 11, wherein each of the first servo sectors comprises a track address and the control circuitry is operable to write the second servo sectors from the second diameter of the disk toward the middle diameter of the disk by processing the read signal to detect the track address in one of the previously written first servo sectors.

17. The disk drive as recited in claim 16, wherein the control circuitry is further operable to process the track addresses in the previously written first servo sectors to write the second servo sectors to form a controlled overlap of servo tracks near the middle diameter of the disk.

18. A method of servo writing a disk of a disk drive, the disk drive comprising the disk and a head actuated over the disk, the method comprising the steps of:
    writing a plurality of seed tracks to the disk, wherein each seed track extends across substantially an entire radius of the disk;
    processing the seed tracks to write first servo sectors in a first radial direction to define servo tracks from a first diameter of the disk to substantially a middle diameter of the disk; and
    processing the seed tracks to write second servo sectors in a second radial direction opposite the first radial direction to define servo tracks from a second diameter of the disk toward the middle diameter of the disk.

19. The method as recited in claim 18, wherein the step of writing the second servo sectors from the second diameter of the disk toward the middle diameter of the disk comprises the step of writing the second servo sectors to form a controlled overlap of servo tracks near the middle diameter of the disk.

20. The method as recited in claim 18, wherein an external servo writer is used to write the seed tracks.

21. The method as recited in claim 18, wherein a media writer is used to write the seed tracks.

22. The method as recited in claim 18, wherein the plurality of seed tracks comprise a plurality of spiral tracks, wherein each spiral track comprises a high frequency signal interrupted by a sync mark at a sync mark interval.

23. The method as recited in claim 18, wherein each of the first servo sectors comprises a track address and the step of writing the second servo sectors from the second diameter of the disk toward the middle diameter of the disk comprises the step of processing the read signal to detect the track address in one of the previously written first servo sectors.

24. The method as recited in claim 23, further comprising the step of processing the track addresses in the previously written first servo sectors to write the second servo sectors to form a controlled overlap of servo tracks near the middle diameter of the disk.

25. A disk drive comprising:
   (a) a disk comprising a plurality of seed tracks, wherein each seed track extends across substantially an entire radius of the disk;
   (b) a head actuated over the disk; and
   (c) control circuitry operable to:
      process the seed tracks to write first servo sectors in a first radial direction to define servo tracks from a first diameter of the disk to substantially a middle diameter of the disk; and
      process the seed tracks to write second servo sectors in a second radial direction opposite the first radial direction to define servo tracks from a second diameter of the disk toward the middle diameter of the disk.

26. The disk drive as recited in claim 25, wherein the control circuitry is operable to write the second servo sectors from the second diameter of the disk toward the middle diameter of the disk by writing the second servo sectors to form a controlled overlap of servo tracks near the middle diameter of the disk.

27. The disk drive as recited in claim 25, wherein an external servo writer is used to write the seed tracks.

28. The disk drive as recited in claim 25, wherein a media writer is used to write the seed tracks.

29. The disk drive as recited in claim 25, wherein the plurality of seed tracks comprise a plurality of spiral tracks, wherein each spiral track comprises a high frequency signal interrupted by a sync mark at a sync mark interval.

30. The disk drive as recited in claim 25, wherein each of the first servo sectors comprises a track address and the control circuitry is operable to write the second servo sectors from the second diameter of the disk toward the middle diameter of the disk by processing the read signal to detect the track address in one of the previously written first servo sectors.

31. The disk drive as recited in claim 30, wherein the control circuitry is further operable to process the track addresses in the previously written first servo sectors to write the second servo sectors to form a controlled overlap of servo tracks near the middle diameter of the disk.

* * * * *